US008853337B2

(12) United States Patent
Hirono et al.

(10) Patent No.: US 8,853,337 B2
(45) Date of Patent: Oct. 7, 2014

(54) WATER/OIL REPELLENT COMPOSITION AND ARTICLE

(71) Applicant: Asahi Glass Company, Limited, Chiyoda-ku (JP)

(72) Inventors: Takao Hirono, Chiyoda-ku (JP); Yuuichi Oomori, Chiyoda-ku (JP); Minako Shimada, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 13/764,138

(22) Filed: Feb. 11, 2013

(65) Prior Publication Data

US 2013/0190444 A1    Jul. 25, 2013

Related U.S. Application Data

(63) Continuation of application No. PCT/JP2011/068308, filed on Aug. 10, 2011.

(30) Foreign Application Priority Data

Aug. 11, 2010 (JP) ................................. 2010-180245

(51) Int. Cl.
*C08F 16/24* (2006.01)

(52) U.S. Cl.
USPC ........... 526/247; 524/755; 524/765; 524/773; 524/801

(58) Field of Classification Search
USPC ................... 526/247; 524/755, 765, 773, 801
See application file for complete search history.

(56) References Cited

U.S. PATENT DOCUMENTS

| | | | | |
|---|---|---|---|---|
| 5,688,309 A | * | 11/1997 | Shimada et al. | 106/2 |
| 5,876,617 A | * | 3/1999 | Sato et al. | 252/8.62 |
| 6,590,035 B2 | * | 7/2003 | Shimada et al. | 525/199 |
| 6,646,043 B2 | | 11/2003 | Funaki et al. | |
| 7,989,567 B2 | * | 8/2011 | Sugiyama et al. | 526/224 |
| 2005/0113519 A1 | * | 5/2005 | Buckanin et al. | 525/199 |
| 2010/0113665 A1 | | 5/2010 | Hirono et al. | |
| 2012/0259045 A1 | | 10/2012 | Hirono et al. | |

FOREIGN PATENT DOCUMENTS

| | | | |
|---|---|---|---|
| EP | 1298180 A1 | * | 4/2003 |
| EP | 1788047 A1 | * | 5/2007 |
| JP | 2-115293 | | 4/1990 |
| JP | 02-115293 A | | 4/1990 |
| JP | 8-199111 | | 8/1996 |
| JP | 08-199111 A | | 8/1996 |
| JP | 8-259877 | | 10/1996 |
| JP | 9-137382 | | 5/1997 |
| JP | 09-137382 A | | 5/1997 |
| JP | 2008/136435 | | 11/2008 |
| JP | 2008/136436 | | 11/2008 |
| WO | WO 2008/136436 A1 | | 11/2008 |

OTHER PUBLICATIONS

International Search Report issued Sep. 13, 2011 in PCT/JP2011/068308 filed Aug. 10, 2011.

* cited by examiner

*Primary Examiner* — Peter D. Mulcahy
*Assistant Examiner* — Henry Hu
(74) *Attorney, Agent, or Firm* — Oblon, Spivak, McClelland, Maier & Neustadt, L.L.P.

(57) ABSTRACT

A water- and oil-repellent agent composition having a lower environmental impact to obtain articles having higher water-repellent friction durability and improved texture. The invention also provides an article treated on the surface with the water- and oil-repellent agent composition. The water- and oil-repellent agent composition includes a first fluoropolymer having structural units based on a first monomer and structural units based on a second monomer; a second fluoropolymer (excluding the first fluoropolymer) having structural units based on a third monomer; and an aqueous medium. The first monomer: compound represented by $(Z-Y)_n X$, where Z is a $C_{1-6}$ polyfluoroalkyl group or the like, Y is a bivalent organic group or the like, n is 1 or 2, and X is a polymerizable unsaturated group. The second monomer: (meth)acrylate having a $C_{18-30}$ alkyl group but not a polyfluoroalkyl group. The third monomer: a fluoroolefin.

6 Claims, No Drawings

WATER/OIL REPELLENT COMPOSITION AND ARTICLE

TECHNICAL FIELD

The present invention relates to a water/oil repellent composition, and an article having a surface treated with the water/oil repellent composition.

BACKGROUND ART

As a method for imparting water/oil repellency to the surface of an article (such as a fiber product), a method of treating the article by means of a water/oil repellent composition composed of an emulsion having, dispersed in a medium, a copolymer having structural units based on a monomer having a polyfluoroalkyl group having at least 8 carbon atoms (a polyfluoroalkyl group will be hereinafter referred to as a $R^f$ group), has been known.

However, recently, EPA (US Environmental Protection Agency) has pointed out that a compound having a perfluoroalkyl group (a perfluoroalkyl group will be hereinafter referred to as a $R^F$ group) having at least 8 carbon atoms is likely to be decomposed in the environment or in vivo, and the decomposition product is likely to be accumulated, i.e. it presents a high environmental impact. Therefore, a copolymer for a water/oil repellent composition has been required which has structural units based on a monomer having a $R^F$ group having at most 6 carbon atoms, wherein structural units based on a monomer having a $R^F$ group having at least 8 carbon atoms are reduced as far as possible.

As a water/oil repellent composition containing such a copolymer, the following water/oil repellent composition has been, for example, proposed.

A water/oil repellent composition comprising a copolymer having structural units based on the following monomer (a), structural units based on the following monomer (b) and structural units based on the following monomer (c), and a medium (Patent Document 1):

Monomer (a): A monomer having a $R^E$ group having at most 6 carbon atoms.

Monomer (b): A (meth)acrylate having an alkyl group having from 20 to 30 carbon atoms.

Monomer (c): Vinylidene chloride

However, of an article having a surface treated with such a water/oil repellent composition, the water repellency is likely to be deteriorated e.g. by friction against the surface (for example, in the case of a fiber product, rubbing between pieces of cloth).

As a method for imparting durability to an article having a surface treated with the water/oil repellent composition, a method of using a crosslinking agent in combination by adding a compound containing a large number of hydroxy groups such as sorbitol to the water/oil repellent composition has been known. However, even with such a method, sufficient abrasion durability has not yet been obtained.

Further, it has been known that addition of inorganic fine particles such as colloidal silica to the water/oil repellent composition is effective against stain during drying such as dirt. However, even in such a case, sufficient abrasion durability can hardly be obtained.

PRIOR ART DOCUMENT

Patent Document

Patent Document 1: WO2008/136435

DISCLOSURE OF INVENTION

Technical Problem

The present invention provides a water/oil repellent composition with which an article having high abrasion durability of water repellency and having improved texture as compared with an article having a surface treated with a conventional water/oil repellent composition, can be obtained, and which presents a low environmental impact, and an article having a surface treated with such a water/oil repellent composition.

Solution to Problem

The water/oil repellent composition of the present invention comprises:

a fluorinated polymer (A) having structural units based on the following monomer (a) and structural units based on the following monomer (b);

a fluorinated polymer (B) (excluding the fluorinated polymer (A)) having structural units based on the following monomer (c); and an aqueous medium (C):

monomer (a): a compound represented by the following formula (1):

$$(Z-Y)_n X \quad (1)$$

wherein Z is a $C_{1-6}$ polyfluoroalkyl group or a group represented by the following formula (2), Y is a bivalent organic group or a single bond, n is 1 or 2, and X is, when n is 1, any one of the groups represented by the following formulae (3-1) to (3-5) and, when n is 2, any one of the groups represented by the following formulae (4-1) to (4-4):

$$C_iF_{2i+1}O(CFX^1CF_2O)_j CFX^2- \quad (2)$$

wherein i is an integer of from 1 to 6, j is an integer of from 0 to 10, and each of $X^1$ and $X^2$ is a fluorine atom or a trifluoromethyl group;

$$-CR=CH_2 \quad (3\text{-}1)$$

$$-C(O)OCR=CH_2 \quad (3\text{-}2)$$

$$-OC(O)CR=CH_2 \quad (3\text{-}3)$$

$$-OCH_2\text{-}\phi\text{-}CR=CH_2 \quad (3\text{-}4)$$

$$-OCH=CH_2 \quad (3\text{-}5)$$

wherein R is a hydrogen atom, a methyl group or a halogen atom, and φ is a phenylene group;

$$-CH[-(CH_2)_m CR=CH_2]- \quad (4\text{-}1)$$

$$-CH[-(CH_2)_m C(O)OCR=CH_2]- \quad (4\text{-}2)$$

$$-CH[-(CH_2)_m OC(O)CR=CH_2]- \quad (4\text{-}3)$$

$$-OC(O)CH=CHC(O)O- \quad (4\text{-}4)$$

where R is a hydrogen atom, a methyl group or a halogen atom, and m is an integer of from 0 to 4;

monomer (b): a (meth)acrylate having no polyfluoroalkyl group and having a $C_{18\text{-}30}$ alkyl group;

monomer (c): a fluoroolefin.

The proportion of the structural units based on the monomer (a) in the fluorinated polymer (A) is preferably from 5 to 60 mass % of the structural units (100 mass %) based on all the monomers constituting the fluorinated polymer (A), and the proportion of the structural units based on the monomer (b) in the fluorinated polymer (A) is preferably from 40 to 95 mass % of the structural units (100 mass %) based on all the monomers constituting the fluorinated polymer (A).

The number average molecular weight of the fluorinated polymer (B) is preferably from 1,000,000 to 30,000,000.

The amount of the fluorinated polymer (B) is preferably from 0.1 to 10 parts by mass per 100 parts by mass of the fluorinated polymer (A).

The average particle size of the fluorinated polymer (B) is preferably from 10 to 1,000 nm.

The article of the present invention is one having a surface treated with the water/oil repellent composition of the present invention.

Advantageous Effects of Invention

By the water/oil repellent composition of the present invention, an article having high abrasion durability of the water repellency and having improved texture as compared with an article having a surface treated with a conventional water/oil repellent composition can be obtained. Further, the water/oil repellent composition of the present invention presents a low environmental impact.

The article of the present invention has high abrasion durability of the water repellency and has improved texture as compared with an article having a surface treated with a conventional water/oil repellent composition, and further presents a low environmental impact.

DESCRIPTION OF EMBODIMENTS

In this specification, a compound represented by the formula (1) will be referred to as a compound (1). Compounds represented by other formulae will also be referred to in the same manner. Further, in this specification, a group represented by the formula (2) will be referred to as a group (2). Groups represented by other formulae will also be referred to in the same manner. Further, a (meth)acrylate in this specification means an acrylate or a methacrylate. Further, in this specification, a monomer means a compound having a polymerizable unsaturated group. Further, in this specification, a $R^f$ group is a group having some or all of hydrogen atoms in an alkyl group substituted by fluorine atoms, and a $R^F$ group is a group having all hydrogen atoms in an alkyl group substituted by fluorine atoms.

<Water/Oil Repellent Composition>

The water/oil repellent composition of the present invention comprises a fluorinated polymer (A), a fluorinated polymer (B) and a medium, as essential components, and may further contain a surfactant, an additive or the like, as the case requires.

(Fluorinated Polymer (A))

The fluorinated polymer (A) is a copolymer which has structural units based on a monomer (a) and structural units based on a monomer (b). The fluorinated polymer (A) preferably further has structural units based on a monomer (d) and/or structural units based on a monomer (e), and may have structural units based on a monomer (c) or structural units based on a monomer (f), as the case requires.

Monomer (a):

The monomer (a) is a compound (1). Here, in the formula (1), the boundary between Z and Y is determined so that the number of carbon atoms in Z becomes smallest.

$(Z-Y)_nX$      (1)

Z is a $C_{1-6}$ $R^f$ group (provided that the $R^f$ group may contain an etheric oxygen atom) or a group (2):

$C_iF_{2i+1}O(CFX^1CF_2O)_jCFX^2—$      (2)

wherein i is an integer of from 1 to 6, j is an integer of from 0 to 10, and each of $X^1$ and $X^2$ which are independent of each other, is a fluorine atom or a trifluoromethyl group.

The $R^f$ group is preferably a $R^F$ group. The $R^f$ group may be linear or branched, preferably linear.

Z may, for example, be the following groups:
$F(CF_2)_4—$,
$F(CF_2)_5—$,
$F(CF_2)_6—$,
$(CF_3)_2CF(CF_2)_2—$,
$C_kF_{2k+1}O[CF(CF_3)CF_2O]_h—CF(CF_3)—$, etc.
wherein k is an integer of from 1 to 6, and h is an integer of from 0 to 10.

Y is a bivalent organic group or a single bond.

The bivalent organic group is preferably an alkylene group. The alkylene group may be linear or branched. The bivalent organic group may have —O—, —NH—, —CO—, —S—, —SO$_2$—, —CD$^1$=CD$^2$— (wherein each of D$^1$ and D$^2$ which are independent of each other, is a hydrogen atom or a methyl group), etc.

Y may, for example, be the following groups.
—CH$_2$—,
—CH$_2$CH$_2$—,
—(CH$_2$)$_3$—,
—CH$_2$CH$_2$CH(CH$_3$)—,
—CH=CH—CH$_2$—,
—S—CH$_2$CH$_2$—,
—CH$_2$CH$_2$—S—CH$_2$CH$_2$—,
—CH$_2$CH$_2$—SO$_2$—CH$_2$CH$_2$—,
—W—OC(O)NH-A-NHC(O)O—(C$_p$H$_{2p}$)—, etc.
wherein p is an integer of from 2 to 30.

A is a symmetric alkylene group having no branch, an arylene group or an aralkylene group and is preferably —C$_6$H$_{12}$—, -φ-CH$_2$-φ- or -φ- (wherein φ is a phenylene group).

W is any one of the following groups.
—SO$_2$N(R$^1$)—C$_d$H$_{2d}$—,
—CONHC$_d$H$_{2d}$—,
—CH(R$^{F1}$)—C$_e$H$_{2e}$—,
—C$_q$H$_{2q}$—
wherein R$^1$ is a hydrogen atom or a C$_{1-4}$ alkyl group, d is an integer of from 2 to 8, R$^{F1}$ is a C$_{1-20}$ perfluoroalkyl group, e is an integer of from 0 to 6, and q is an integer of from 1 to 20. R$^{F1}$ is preferably a C$_{1-6}$ perfluoroalkyl group, more preferably a C$_4$ or C$_6$ perfluoroalkyl group.

n is 1 or 2.

X is, when n is 1, any one of groups (3-1) to (3-5) and when n is 2, any one of groups (4-1) to (4-4):

| | |
|---|---|
| —CR=CH$_2$ | (3-1) |
| —C(O)OCR=CH$_2$ | (3-2) |
| —OC(O)CR=CH$_2$ | (3-3) |
| —OCH$_2$-φ-CR=CH$_2$ | (3-4) |
| —OCH=CH$_2$ | (3-5) | wherein R is a hydrogen atom, a methyl group or a halogen atom, and φ is a phenylene group.

| | |
|---|---|
| —CH[—(CH$_2$)$_m$CR=CH$_2$]— | (4-1) |
| —CH[—(CH$_2$)$_m$C(O)OCR=CH$_2$]— | (4-2) |
| —CH[—(CH$_2$)$_m$OC(O)CR=CH$_2$]— | (4-3) |
| —OC(O)CH=CHC(O)O— | (4-4) | wherein R is a hydrogen atom, a methyl group or a halogen atom, and m is an integer of from 0 to 4.

The compound (1) is preferably a (meth)acrylate having a $C_{4-6}R^F$ group from the viewpoint of e.g. the polymerizability with other monomers, the flexibility of a coating film containing the fluorinated polymer (A), the adhesion of the fluorinated polymer (A) to an article, the dispersibility in an aqueous medium and efficiency of the emulsion polymerization.

The compound (1) is preferably a compound wherein Z is a $C_{4-6}R^F$ group, Y is a $C_{1-4}$ alkylene group, n is 1, and X is the group (3-3).

Monomer (b):

The monomer (b) is a (meth)acrylate having no $R^f$ group and having a $C_{18-30}$ alkyl group. When the alkyl group has at least 18 carbon atoms, good water repellency against water fallen from a height (rain fall) (hereinafter referred to as dynamic water repellency) and water repellency after drying without forcibly heating after washing (hereinafter referred to as post-air-drying water repellency) will be obtained. When the alkyl group has at most 30 carbon atoms, the melting point tends to be relatively low, thus leading to good handling efficiency.

The monomer (b) is preferably a (meth)acrylate having a $C_{18-30}$ alkyl group, more preferably behenyl (meth)acrylate or stearyl (meth)acrylate, particularly preferably behenyl (meth)acrylate.

Monomer (c):

The monomer (c) is a fluoroolefin.

The fluoroolefin may, for example, be tetrafluoroethylene, hexafluoropropylene, chlorotrifluoroethylene or vinylidene fluoride, and is preferably tetrafluoroethylene or vinylidene fluoride.

Monomer (d):

The monomer (d) is a monomer having no $R^f$ group and having a crosslinkable functional group.

By having structural units based on the monomer (d), the abrasion durability of a coating film containing the fluorinated polymer (A) will further be improved.

The crosslinkable functional group is preferably a functional group having at least one bond selected from a covalent bond, an ionic bond and a hydrogen bond, or a functional group capable of forming a crosslinked structure by an interaction of such a bond. Otherwise, a compound having an active organic group or an element such as hydrogen or halogen in its molecule may be used.

Such a functional group is preferably a hydroxy group, an isocyanate group, a blocked isocyanate group, an alkoxysilyl group, an amino group, an alkoxymethylamide group, a silanol group, an ammonium group, an amide group, an epoxy group, an oxazoline group, a carboxy group, an alkenyl group, a sulfonic acid group or the like, particularly preferably a hydroxy group, a blocked isocyanate group, an amino group or an epoxy group.

The monomer (d) is preferably a (meth)acrylate, an acrylamide, a vinyl ether or a vinyl ester.

The monomer (d) may, for example, be the following compounds.

2-Isocyanatoethyl (meth)acrylate, 3-isocyanatopropyl (meth)acrylate, 4-isocyanatobutyl (meth)acrylate, a 2-butanoneoxime adduct of 2-isocyanatoethyl (meth)acrylate, a pyrazole adduct of 2-isocyanatoethyl (meth)acrylate, a 3,5-dimethylpyrazole adduct of 2-isocyanatoethyl (meth)acrylate, a 3-methylpyrazole adduct of 2-isocyanatoethyl (meth) acrylate, an ε-caprolactam adduct of 2-isocyanatoethyl (meth)acrylate, a 2-butanoneoxime adduct of 3-isocyanatopropyl (meth)acrylate, a pyrazole adduct of 3-isocyanatopropyl (meth)acrylate.

A 3,5-dimethylpyrazole adduct of 3-isocyanatopropyl (meth)acrylate, a 3-methylpyrazole adduct of 3-isocyanatopropyl (meth)acrylate, an ε-caprolactam adduct of 3-isocyanatopropyl (meth)acrylate, a 2-butanoneoxime adduct of 4-isocyanatobutyl (meth)acrylate, a pyrazole adduct of 4-isocyanatobutyl (meth)acrylate, a 3,5-dimethylpyrazole adduct of 4-isocyanatobutyl (meth)acrylate, a 3-methylpyrazole adduct of 4-isocyanatobutyl (meth)acrylate, an ε-caprolactam adduct of 4-isocyanatobutyl (meth)acrylate.

Methoxymethyl (meth)acrylamide, ethoxymethyl (meth)acrylamide, butoxymethyl (meth)acrylamide, diacetone acrylamide, γ-methacryloyloxypropyl trimethoxysilane, trimethoxy vinyl silane, vinyl trimethoxysilane, dimethylaminoethyl (meth)acrylate, diethylaminoethyl (meth)acrylate, dimethylaminopropyl (meth)acrylate, (meth)acryloylmorpholine, (meth)acryloyloxyethyl trimethylammonium chloride, (meth)acryloyloxypropyl trimethylammonium chloride, (meth)acrylamideethyl trimethylammonium chloride, (meth)acrylamidepropyl trimethylammonium chloride.

t-butyl (meth)acrylamide sulfonic acid, (meth)acrylamide, N-methyl (meth)acrylamide, N-methylol (meth)acrylamide, N-butoxymethyl (meth)acrylamide, diacetone (meth)acrylamide, glycidyl (meth)acrylate, 2-hydroxyethyl (meth)acrylate, 2-hydroxypropyl (meth)acrylate, 4-hydroxybutyl (meth)acrylate, 3-chloro-2-hydroxypropyl methacrylate, polyoxyalkylene glycol mono(meth)acrylate, (meth)acrylic acid, 2-(meth)acryloyloxyethyl succinic acid, 2-(meth)acryloyloxyhexahydrophthalic acid, 2-(meth)acryloyloxyethyl acid phosphate, allyl (meth)acrylate, 2-vinyl-2-oxazoline, a polycaprolactone ester of 2-vinyl-4-methyl-(2-vinyloxazoline)hydroxyethyl (meth)acrylate.

Tri(meth)allyl isocyanurate (T(M)AIC manufactured by Nippon Kasei Chemical Co., Ltd.), triallyl cyanurate (TAC manufactured by Nippon Kasei Chemical Co., Ltd.), phenylglycidylethyl acrylate tolylene diisocyanate (AT-600 manufactured by KYOEISHA CHEMICAL Co., Ltd.), 3-(methylethylketoxime)isocyanatomethyl-3,5,5-trimethyl-cyclohexyl(2-hydroxyethyl methacrylate) cyanate (TECH-COAT HE-6P manufactured by Kyoken Kasei), a polycaprolactone ester of hydroxyethyl (meth)acrylate (PLACCEL FA, FM series manufactured by Daicel Chemical Industries, Ltd.).

Vinyl momochloroacetate, 2-chloroethyl vinyl ether, 2-hydroxyethyl vinyl ether, 3-hydroxypropyl vinyl ether, 2-hydroxypropyl vinyl ether, 2-hydroxyisopropyl vinyl ether, 4-hydroxybutyl vinyl ether, 4-hydroxycyclohexyl vinyl ether, 1,6-hexanediol monovinyl ether, 1,4-cyclohexanedimethanol monovinyl ether, diethylene glycol monovinyl ether, triethylene glycol monovinyl ether, dipropylene glycol monovinyl ether, vinyl glycidyl ether, 2-aminoethyl vinyl ether, 3-aminopropyl vinyl ether, 2-aminobutyl vinyl ether, allyl vinyl ether, 1,4-butanediol divinyl ether, nonanediol divinyl ether, cyclohexanediol divinyl ether, cyclohexanedimethanol divinyl ether, triethylene glycol divinyl ether, trimethylolpropane trivinyl ether, pentaerythritol tetravinyl ether.

The monomer (d) is preferably N-methylol (meth)acrylamide, 2-hydroxyethyl (meth)acrylate, glycidyl (meth)acrylate, 3-chloro-2-hydroxypropyl methacrylate, a polycaprolactone ester of hydroxyethyl (meth)acrylate (PLACCEL FA or FM-series manufactured by Daicel Chemical Industries, Ltd.).

Monomer (e):

The monomer (e) is a halogenated olefin (excluding the monomer (c)).

By having the structural units based on the monomer (e), the strength of a coating film containing the fluorinated polymer (A) will be improved, and the adhesion between a coating film containing the fluorinated polymer (A) and a substrate will be improved.

The monomer (e) is particularly preferably vinyl chloride or vinylidene chloride, considering the interaction with a substrate.

Monomer (f):

The monomer (f) is a monomer other than the monomers (a), (b), (c), (d) and (e).

The monomer (f) may, for example, be the following compounds.

Methyl (meth)acrylate, ethyl (meth)acrylate, propyl (meth)acrylate, butyl (meth)acrylate, cyclohexyl (meth)acrylate, 2-ethylhexyl (meth)acrylate, n-hexyl (meth)acrylate, benzyl (meth)acrylate, octyl (meth)acrylate, decyl methacrylate, 3-ethoxypropyl acrylate, methoxy-butyl acrylate, 2-ethylbutyl acrylate, 1,3-dimethylbutyl acrylate, 2-methylpentyl acrylate, n-propyl vinyl ether, isopropyl vinyl ether, n-butyl vinyl ether, isobutyl vinyl ether, 2-ethylhexyl vinyl ether, octadecyl vinyl ether, cyclohexyl vinyl ether.

Vinyl acetate, vinyl propionate, butene, isoprene, butadiene, ethylene, propylene, vinyl ethylene, pentene, ethyl-2-propylene, butylethylene, cyclohexylpropylethylene, decylethylene, dodecylethylene, hexene, isohexylethylene, neopentylethylene, (1,2-diethoxycarbonyl)ethylene, (1,2-dipropoxycarbonyl)ethylene, methoxyethylene, ethoxyethylene, butoxyethylene, 2-methoxypropylene, pentyloxyethylene, cyclopentanoyloxyethylene, cyclopentylacetoxyethylene, styrene, α-methylstyrene, p-methylstyrene, hexylstyrene, octylstyrene, nonylstyrene.

N,N-dimethyl (meth)acrylamide, vinyl alkyl ether, halogenated alkyl vinyl ether, vinyl alkyl ketone, aziridinylethyl (meth)acrylate, 2-ethylhexylpolyoxyalkylene (meth)acrylate, polyoxyalkylene di(meth)acrylate.

Crotonic acid alkylester, maleic acid alkylester, fumaric acid alkylester, citraconic acid alkylester, mesaconic acid alkylester, triallyl cyanurate, allyl acetate, N-vinylcarbazole, maleimide, N-methylmaleimide, a (meth)acrylate having silicone in its side chain, a (meth)acrylate having a urethane bond, a (meth)acrylate having a polyoxyalkylene chain having a $C_{1-4}$ alkyl group at its terminal, an alkylene di(meth)acrylate, etc.

The monomer (f) is preferably butyl (meth)acrylate, cyclohexyl (meth)acrylate, 2-ethylhexyl (meth)acrylate, vinyl acetate, isoprene, styrene, N,N-dimethyl (meth)acrylamide, polyoxyalkylene di(meth)acrylate, a (meth)acrylate having silicone in its side chain, or a (meth)acrylate having a urethane bond.

As combination of structural units based on monomers, from the viewpoint of the dynamic water repellency and the post-air-drying water repellency, preferred is a combination of structural units abased on the monomer (a): a (meth)acrylate having a $C_{4-6}$ $R^F$ group, structural units based on the monomer (b): behenyl (meth)acrylate of stearyl (meth)acrylate, structural units based on the monomer (d) and structural units based on the monomer (e): vinyl chloride or vinylidene chloride.

The proportion of the structural units based on the monomer (a) is preferably from 5 to 60 mass %, more preferably from 5 to 40 mass %, particularly preferably from 5 to 30 mass %, of the structural units (100 mass %) based on all the monomers, from the viewpoint of the dynamic water repellency and the post-air-drying water repellency.

The proportion of the structural units based on the monomer (b) is preferably from 40 to 95 mass %, more preferably from 45 to 90 mass %, particularly preferably from 50 to 85 mass %, of the structural units (100 mass %) based on all the monomers, from the viewpoint of the dynamic water repellency and the post-air-drying water repellency.

The proportion of the structural units based on the monomer (d) is preferably from 0 to 15 mass % of the structural units (100 mass %) based on all the monomers, and from the viewpoint of the abrasion durability, it is more preferably from 0.1 to 15 mass %, particularly preferably from 0.1 to 12 mass %.

The proportion of the structural units based on the monomer (e) is preferably from 0 to 40 mass % of the structural units (100 mass %) based on all the monomers, and from the viewpoint of the strength of the coating film and the adhesion, it is more preferably from 5 to 40 mass %, particularly preferably from 10 to 30 mass %.

The total proportion of the structural units based on the monomer (C) and the structural units based on the monomer (f) is preferably from 0 to 20 mass %, more preferably from 0 to 10 mass %, of the structural units (100 mass %) based on all the monomers.

In the present invention, the proportion of the structural units based on a monomer is obtained by the NMR (nuclear magnetic resonance) analysis and the elemental analysis. In a case where it cannot be obtained by the NMR analysis and the elemental analysis, it may be calculated based on the charged amount of the monomer at the time of the production of a water/oil repellent composition.

The mass average molecular weight (Mw) of the fluorinated polymer (A) is preferably at least 40,000, more preferably at least 50,000, further preferably at least 80,000 from the viewpoint of the dynamic water repellency and the post-air drying water repellency. The mass average molecular weight (Mw) of the fluorinated polymer (A) is preferably at most 1,000,000, particularly preferably at most 500,000, from the viewpoint of the film-forming property and the storage stability.

The number average molecular weight (Mn) of the fluorinated polymer (A) is preferably at least 20,000, particularly preferably at least 30,000. On the other hand, the number average molecular weight (Mn) of the fluorinated polymer (A) is preferably at most 500,000, particularly preferably at most 200,000.

The mass average molecular weight (Mw) and the number average molecular weight (Mn) of the fluorinated polymer (A) are a molecular weight calculated as polystyrene, as measured by gel permeation chromatography (GPC), and specifically measured by the following method.

The fluorinated polymer (A) is dissolved in tetrahydrofuran (hereinafter referred to as THF) to obtain a 1 mass % solution, which is passed through a 0.2 μm filter to prepare a sample for analysis. With respect to the sample, the number average molecular weight (Mn) and the mass average molecular weight (Mw) are measured under the following conditions.

Measurement temperature: 23° C.
Injected amount: 0.2 mL (milliliter)
Outflow rate: 1 mL/min
Eluent: THF (Method for Producing Fluorinated Polymer (A))

The fluorinated polymer (A) is produced, for example, by the following method.

A method which comprises polymerizing a monomer mixture comprising the monomer (a) and the monomer (b), and as the case requires, the monomer (c), the monomer (d), the monomer (e), the monomer (f) and the like, in a medium in the presence of a polymerization initiator and as the case requires, a surfactant, to obtain a solution, dispersion or emulsion of the fluorinated polymer (A).

The polymerization method may, for example, be a dispersion polymerization method, an emulsion polymerization method or a suspension polymerization method, and emulsion polymerization is preferred. Further, it may be polymerization all at once or multistage polymerization.

The method for producing the fluorinated polymer (A) is preferably a method wherein a monomer mixture comprising the monomer (a), the monomer (b) and the monomer (c) and containing the monomer (d) and/or the monomer (e) as the case requires, is polymerized by emulsion polymerization in an aqueous medium in the presence of a surfactant and a polymerization initiator to obtain an emulsion of the fluorinated polymer (A).

With a view to improving the yield of the fluorinated polymer (A), it is preferred to pre-emulsify the mixture comprising the monomers, the surfactant and the aqueous medium, prior to the emulsion polymerization. For example the mixture comprising the monomers, the surfactant and the aqueous medium is mixed and dispersed by a homomixer or a high pressure emulsifier.

The polymerization initiator may, for example, be a thermal polymerization initiator, a photopolymerization initiator, a radiation polymerization initiator, a radical polymerization initiator or an ionic polymerization initiator, and a water-soluble or oil-soluble radical polymerization initiator is preferred.

As the radical polymerization initiator, a common initiator such as an azo type polymerization initiator, a peroxide type polymerization initiator or a redox type initiator is employed depending upon the polymerization temperature. As the radical polymerization initiator, an azo type compound is particularly preferred, and in a case where polymerization is carried out in an aqueous medium, a salt of an azo type compound is more preferred. The polymerization temperature is preferably from 20 to 150° C.

The amount of the polymerization initiator is preferably from 0.1 to 5 parts by mass, more preferably from 0.1 to 3 parts by mass, per 100 parts by mass of the monomer mixture.

At the time of polymerization of the monomer mixture, a molecular weight-controlling agent may be employed. The molecular weight controlling agent is preferably an aromatic compound, a mercapto alcohol or a mercaptan, particularly preferably an alkylmercaptan. The molecular weight-controlling agent may, for example, be mercaptoethanol, n-octylmercaptan, n-dodecylmercaptan, t-dodecylmercaptan, stearylmercaptan or α-methylstyrene dimer ($CH_2=C(Ph)CH_2C(CH_3)_2Ph$ (wherein Ph is a phenyl group)).

The amount of the molecular weight-controlling agent is preferably from 0 to 5 parts by mass, more preferably from 0 to 3 parts by mass, per 100 parts by mass of the monomer mixture.

Otherwise, the monomer mixture may be polymerized in the presence of a polyfunctional mercapto compound such as diethylene glycol bis(3-mercaptobutyrate), pentaerythritol tetrakis(3-mercaptobutyrate), 2,4,6-trimercaptotriazine or 1,3,5-tris(3-mercaptobutyloxyethyl)-1,3,5-triazine-2,4,6 (1H,3H,5H)-trione.

The proportions (mass %) of the amounts of the respective monomers in the monomer mixture to be used for the polymerization are as follows.

From the viewpoint of the dynamic water repellency and the post-air-drying water repellency, the proportion of the monomer (a) is preferably from 5 to 60 mass %, more preferably from 5 to 40 mass %, particularly preferably from 5 to 30 mass %, in the monomer mixture (100 mass %).

From the viewpoint of the dynamic water repellency and the post-air-drying water repellency, the proportion of the monomer (b) is preferably from 40 to 95 mass %, more preferably from 45 to 90 mass %, particularly preferably from 50 to 85 mass %, in the monomer mixture (100 mass %).

The proportion of the monomer (d) is preferably from 0 to 15 mass % in the monomer mixture (100 mass %), and from the viewpoint of the abrasion durability, it is more preferably from 0.1 to 15 mass %, particularly preferably from 0.1 to 12 mass %.

The proportion of the monomer (e) is preferably from 0 to 40 mass % in the monomer mixture (100 mass %), and from the viewpoint of the strength of the coating film and the adhesion, it is more preferably from 5 to 40 mass %, particularly preferably from 10 to 30 mass %.

The total proportion of the monomer (c) and the monomer (f) is preferably from 0 to 20 mass %, more preferably from 0 to 10 mass %, in the monomer mixture (100 mass %).

The solid content concentration of the emulsion of the fluorinated polymer (A) is preferably from 20 to 40 mass %, more preferably from 20 to 30 mass % in the emulsion (100 mass %). The solid content concentration is a concentration including the surfactant in addition to the fluorinated polymer (A).

The solid content concentration of the emulsion is calculated from the mass of the emulsion before heating and the mass after drying for 4 hours by a counter current canal dryer at 120° C.

The average particle size of the fluorinated polymer (A) is preferably from 10 to 1,000 nm, more preferably from 10 to 300 nm, particularly preferably from 10 to 250 nm. When the average particle size is within such a range, it will be unnecessary to use a surfactant, etc. in a large amount, the water repellency will be good, and when dyed cloths are treated, no color fading will result, and the dispersed particles can stably be present in the aqueous medium without precipitation. The average particle size of the fluorinated polymer (A) can be measured by e.g. a dynamic light-scattering apparatus or an electron microscope.

(Fluorinated Polymer (B))

The fluorinated polymer (B) is a homopolymer or copolymer having structural units based on the monomer (c).

The fluorinated polymer (B) may have structural units based on another monomer other than the monomer (c) as the case requires.

Monomer (c):

The monomer (c) is a fluoroolefin.

By having structural units based on the monomer (c), the abrasion durability of a coating film containing the fluorinated polymer (B) and the texture of an article will be improved.

The fluoroolefin may, for example, be tetrafluoroethylene, hexafluoropropylene, chlorotrifluoroethylene or vinylidene fluoride, and is particularly preferably tetrafluoroethylene in view of the abrasion durability and the texture.

The proportion of the structural units based on the monomer (c) is preferably from 50 to 100 mass %, more preferably from 70 to 100 mass %, particularly preferably 100 mass %, of the structural units (100 mass %) based on all the monomers in the fluorinated polymer (B), from the viewpoint of the abrasion durability and the texture.

The proportion of the structural units based on another monomer other than the monomer (c) is preferably from 0 to 50 mass %, more preferably from 0 to 30 mass %, particularly preferably 0%, of the structural units (100 mass %) based on all the monomers in the fluorinated polymer (B).

The number average molecular weight (Mn) of the fluorinated polymer (B) is preferably at least 1,000,000, particularly preferably at least 1,500,000, from the viewpoint of the abrasion durability. If the number average molecular weight (Mn) of the fluorinated polymer (B) exceeds 30,000,000, production tends to be difficult. The number average molecular weight (Mn) of the fluorinated polymer (B) is preferably at most 30,000,000, particularly preferably at most 25,000,000.

The number average molecular weight of the fluorinated polymer (B) is obtained by a method disclosed in Journal of Applied Polymer Science, 17, 3253 (1973) by Suwa et al., employing the heat of crystallization.

Further, the standard specific gravity (hereinafter referred to as SSG) is an index of the average molecular weight of polytetrafluoroethylene (hereinafter referred to as PTFE) obtained by homopolymerization of tetrafluoroethylene, and PTFE can be conceptually distinguished into a high molecular weight PTFE in a case where SSG is from 2.14 and less than 2.22, and a low molecular weight PTFE in a case where SSG is from 2.22 to 2.4. If the polymer has a low molecular weight, the abrasion durability tends to be poor when such a polymer is used in combination, and accordingly SSG is preferably from 2.14 to less than 2.22, particularly preferably from 2.15 to 2.21.

The amount of the fluorinated polymer (B) (solid content) is preferably from 0.1 to 10 parts by mass, more preferably from 0.1 to 5 parts by mass per 100 parts by mass of the fluorinated polymer (A) (solid content). When the amount of the fluorinated polymer (B) is at least 0.1 part by mass, good abrasion durability of a coating film containing the fluorinated polymer (B) and texture of an article will be obtained. When the amount of the fluorinated polymer (B) is at most 10 parts by mass, good dynamic water repellency and post-air-drying water repellency will be obtained.

The fluorinated polymer (B) is preferably used, for example, in the case of PTFE, as an aqueous dispersion dispersed in an aqueous medium, obtained by the production method disclosed in WO2007/046482. The aqueous dispersion of PTFE may be a commercially available product such as AD915 (manufactured by Asahi Glass Company, Limited), Teflon (registered trademark) PTFE 31-JR or 24-JR (manufactured by Du Pont-Mitsui Fluorochemicals Co., Ltd.), Polyflon D-1E or D-210C (manufactured by Daikin Industries, Ltd.), Teflon (registered trademark) PTFE, TE3859, TE3893, TE3864, TE3875, TE3876, TE3885 or TE3908 (manufactured by Du Pont).

The solid content concentration of the aqueous dispersion of the fluorinated polymer (B) is preferably from 15 to 70 mass % in the aqueous dispersion (100 mass %). The solid content concentration is a concentration including the surfactant in addition to the fluorinated polymer (B). About 10 g of a dispersion sample is put in an aluminum dish having a known mass, and the mass after drying at 120° C. for one hour and the mass after the surfactant is decomposed after heating at 380° C. for 35 minutes are obtained, to calculate the PTFE concentration and the concentration of the surfactant based on the mass of PTFE.

The average particle size of the fluorinated polymer (B) is preferably from 100 to 500 nm, more preferably from 180 to 450 nm, particularly preferably from 200 to 350 nm. When the average particle size is within such a range, it will be unnecessary to use a surfactant, etc. in a large amount, and the dispersed particles can stably be present in the aqueous medium without precipitation. The average particle size of the fluorinated polymar (B) can be measured by e.g. a dynamic light-scattering apparatus or an electron microscope.

(Aqueous Medium (C))

The aqueous medium (C) may be water or water containing a water-soluble organic solvent.

The water-soluble organic solvent may, for example, be tert-butanol, propylene glycol, dipropylene glycol, dipropylene glycol monomethyl ether or tripropylene glycol, and is preferably dipropylene glycol or dipropylene glycol monomethyl ether.

In a case where the aqueous medium (C) contains a water-soluble organic solvent, the content of the water-soluble organic solvent is preferably from 1 to 80 parts by mass, more preferably from 10 to 60 parts by mass per 100 parts by mass of water.

(Surfactant)

The surfactant may, for example, be a hydrocarbon type surfactant or a fluorinated surfactant, and each of which may, for example, be an anionic surfactant, a nonionic surfactant, a cationic surfactant, or an amphoteric surfactant.

The total amount of surfactants is preferably from 1 to 10 parts by mass, more preferably from 1 to 7 parts by mass, based on the total amount of the fluorinated polymer (A) and the fluorinated polymer (B) (100 parts by mass).

(Additives)

The additives include, for example, a penetrant, a defoamer, a water-absorbing agent, an antistatic agent, an antistatic polymer, an anticrease agent, a texture-adjusting agent, a film-forming assistant, a water-soluble polymer (such as polyacrylamide or polyvinyl alcohol), a thermosetting agent (such as a melamine resin, a urethane resin, a triazine ring-containing compound or an isocyanate-type compound), an epoxy curing agent (such as isophthalic acid dihydrazide, adipic acid dihydrazide, sebacic acid dihydrazide, dodecanedioic acid dihydrazide, 1,6-hexamethylenebis(N,N-dimethylsemicarbazide), 1,1,1',1'-tetramethyl-4, 4'-(methylene-di-p-phenylene) disemicarbazide or spiroglycol), a thermosetting catalyst, a crosslinking catalyst, a synthetic resin, a fiber-stabilizer and inorganic fine particles.

Further, the water/oil repellent composition of the present invention may contain a copolymer capable of exhibiting water repellency and/or oil repellency (e.g. a commercially available water repellent, a commercially available oil repellent, a commercially available water/oil repellent or a commercially available SR (soil release) agent) other than the fluorinated polymer (A) or a water-repellent compound having no fluorine atom, as the case requires. The water-repellent compound having no fluorine atom may, for example, be a paraffin type compound, an aliphatic amide type compound, an alkylethylene urea compound or a silicone compound.

(Method for Producing Water/Oil Repellent Composition)

The water/oil repellent composition of the present invention is produced, for example, by mixing an emulsion of the fluorinated polymer (A) and an aqueous dispersion of the fluorinated polymer (B), and as the case requires, adding the additives.

In the water/oil repellent composition of the present invention, it is preferred that the fluorinated polymer (A) and the fluorinated polymer (B) are dispersed in the form of particles in the aqueous medium.

At the time of treating an article, the solid content concentration of the water/oil repellent composition of the present invention is preferably from 0.2 to 5 mass %, more preferably from 0.2 to 3 mass % in the water/oil repellent composition (100 mass %). The solid content concentration of the water/oil repellent composition is calculated from the mass of the water/oil repellent composition before heating and the mass after drying for 4 hours by a counter current canal dryer at 120° C.
(Functional Effects)

The water/oil repellent composition of the present invention contains the fluorinated polymer (A) which has structural units based on the monomer (a) and structural units based on the monomer (b), whereby it is possible to impart sufficient water repellency to the surface of an article.

Further, the water/oil repellent composition of the present invention contains the fluorinated polymer (B) which has structural units based on the monomer (c), whereby it is possible to obtain an article having high abrasion durability of the water repellency and having improved texture.

Further, by the water/oil repellent composition of the present invention, the content (content in a case where the solid content concentration is 20%) of perfluorooctanoic acid (PFOA) and perfluorooctanesulfonic acid (PFOS), and their precursors and analogs, of which the effects on the environment are pointed out, can be reduced to a level of not higher than the detection limit as an analytical value of LC-MS/MS (liquid chromatography/mass spectrometry) by the method disclosed in WO2009/081822.

<Article>

The article of the present invention has a surface treated with the water/oil repellent composition of the present invention.

Articles to be treated include, for example, fibers (natural fibers, synthetic fibers, mixed fibers, etc.), various fiber products, nonwoven fabrics, resins, paper, leather, metals, stones, concrete, gypsum and glass.

The treating method may, for example, be a method of coating an article with a coating liquid containing the water/oil repellent composition by a known coating method, followed by drying, or a method of impregnating an article with a coating liquid containing the water/oil repellent composition, followed by drying.

Further, after the treatment with the water/oil repellent composition of the present invention, antistatic finish, softening finish, antibacterial finish, deodorant finish or waterproofing finish may, for example, be carried out.

The waterproofing finish may be processing to provide a waterproofing film. The waterproofing film may be a porous film made of an urethane resin or an acrylic resin, a non-porous film made of an urethane resin or an acrylic resin, a polytetrafluoroethylene film or a moisture-proofing film made of a combination thereof.

By treating an article with the water/oil repellent composition of the present invention, it is possible to impart high quality water/oil repellency to the article. Further, it is possible to impart the water/oil repellency even by curing at a low temperature, due to excellent adhesion to the substrate surface. Further, it is possible to maintain the performance at the initial stage of the processing stably without substantial deterioration of the performance by abrasion or washing. Further, when paper is treated, it is possible to impart an excellent sizing property and water/oil repellency to the paper even under a low temperature drying condition. In a case where it is applied to the surface of a resin, glass or a metal, it is possible to form a water/oil repellent coating film which is excellent in the adhesion to the article and which is excellent in the film-forming property.

EXAMPLES

Now, the present invention will be described in detail with reference to Examples, but it should be understood that the present invention is by no means thereby restricted.

Examples 2 to 4 are Examples of the present invention, and Examples 1 and 5 to 9 are Comparative Examples.

<Physical Properties of Fluorinated Polymer (A)>

With respect to the fluorinated polymer (A) recovered by the following recovery method, its molecular weight was measured.

(Recovery Method)

6 g of an emulsion was dropped into 60 g of 2-propanol (hereinafter referred to as IPA), followed by stirring to precipitate solid. After carrying out centrifugal separation at 3,000 rpm for 5 minutes, the obtained solid was decanted. 12 g of IPA was again added, followed by thorough stirring. After carrying out centrifugal separation at 3,000 rpm for 5 minutes, the obtained solid was separated from the supernatant, followed by vacuum drying at 35° C. overnight to obtain a fluorinated polymer (A).

(Molecular Weight)

The recovered fluorinated polymer (A) was dissolved in THF to obtain a 1 mass % solution, which was passed through a 0.2 μm filter to obtain a sample for analysis. With respect to the sample, the number average molecular weight (Mn) and the mass average molecular weight (Mw) were measured. The conditions for the measurement were as follows.

Apparatus: HLC-8220GPC manufactured by TOSOH CORPORATION

Column: One having TSKgel Multiporer HXL-M columns connected in series.

Measuring temperature: 23° C.

Injected amount: 0.2 mL

Outflow rate: 1 mL/min

Standard sample: EasiCal PM-2 manufactured by Polymer Laboratories

Eluent: THF

<Physical Properties of Fluorinated Polymer (B)>

In accordance with the method by Suwa (J. Appl. Polym. Sci, 17, 3253 (1973)), dried PTFE was subjected to differential thermal analysis, and from the latent heat, the number average molecular weight was obtained.

<Evaluation of Water/Oil Repellency>

(Oil Repellency)

With respect to a test cloth, the oil repellency was evaluated in accordance with the test method in AATCC-TM118-1966. The oil repellency is represented by grades shown in Table 1. A grade having +(−) attached, shows that the property is slightly better (worse).

TABLE 1

| Oil repellency No. | Test solution | Surface tension (25° C.) [mN/m] |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | 65 Parts of nujol/ 35 parts of hexadecane | 29.6 |
| 1 | Nujol | 31.2 |
| 0 | Less than 1 | — |

(Water Repellency)

With respect to a test cloth, the water repellency was evaluated in accordance with the spray test in JIS L1092-1992. The water repellency is represented by five grades of from 1 to 5. The higher the grade number, the better the water repellency. One with grade 3 or higher is regarded as exhibiting water repellency. A grade having +(−) attached shows that the property is slightly better (worse) than the standard property of that grade.

(Washing Durability)

With respect to a test cloth, washing was repeated 20 times in accordance with the water washing method in JIS L0217 Appendix 103. After the washing, it was dried in air overnight in a room having a room temperature of 25° C. under a humidity of 60% RH, whereupon the water repellency was evaluated as described above.

(Abrasion Durability)

A test cloth was rubbed predetermined times by a Martindale type abrasion testing machine (manufactured by James H Heal & Co., Ltd.), and then the water repellency was evaluated as described above.

(Dynamic Water Repellency)

With respect to a test cloth, in accordance with the method (Bundesmann test) disclosed in JIS L1092 method (C), a rainfall test was carried out under such conditions that the amount of rainfall was 100 mL/min, the water temperature of rainfall was 20° C. and the time for rainfall was 10 minutes, whereby the water repellency was evaluated. The water repellency was represented by five grades of from 1 to 5. The larger the grade number, the better the water repellency. One with grade 3 or higher is regarded as exhibiting water repellency. A grade having +(−) attached, shows that the property is slightly better (worse).

(Washing Durability)

With respect to a test cloth, washing was repeated 20 times in accordance with the water washing method in JIS L0217 Appendix 103. After the washing, it was dried in air overnight in a room having a room temperature of 25° C. under a humidity of 50% RH, whereupon the dynamic water repellency was evaluated as described above.

<Evaluation of Texture>

(Handle-O-Meter Method)

With respect to a test cloth, the texture of the cloth was evaluated based on JIS L 1096.8.19.5E (Handle-O-Meter method). The smaller the value, the softer the cloth is.

(Bending Resistance)

With respect to a test cloth, the bending resistance was evaluated by the following procedure with reference to JIS L 1096.8.19 method B (slide method), method D (heart loope method). The smaller the value, the more flexible the cloth is.

(1) A strip test cloth of 10 cm (warp direction)×2 cm was prepared.

(2) The test cloth was put on a wire so that the wire was on the center in the warp direction of the test cloth.

(3) The length from one end to the other end in the warp direction of the test cloth was measured.

(4) A strip test cloth of 10 cm (weft direction)×2 cm was prepared.

(5) The test cloth was put on a wire so that the wire was on the center in the weft direction of the test cloth.

(6) The length from one end to the other end in the weft direction of the test cloth was measured.

(7) Measurement was conducted twice with respect to both the warp direction and the weft direction, and the average of the measurement results totally 4 times in the warp direction and the weft direction was determined.

<Abbreviations>

(Monomer (a))

C6FMA: $C_6F_{13}C_2H_4OC(O)C(CH_3)=CH_2$ (Monomer (b))

STA: stearyl acrylate

BeA: behenyl acrylate (Monomer (d))

NMAM: N-methylolacrylamide

HEMA: 2-hydroxyethylmethacrylate (Monomer (e))

VCM: vinyl chloride (Surfactant)

PEO-20: 10 mass % aqueous solution of polyoxyethylene oleyl ether (Emulgen E430 manufactured by Kao Corporation, about 26 mol adduct of ethylene oxide)

SFY465: 10 mass % aqueous solution of 2,4,7,9-tetramethyl-5-decene-4,7-diolethylene oxide adduct (Surfynol 465 manufactured by Nissin Chemical Industry Co., Ltd., added moles of ethylene oxide: 10)

P204: 10 mass % aqueous solution of ethylene oxide propylene oxide polymer (PRONONE204 manufactured by NOF Corporation, proportion of ethylene oxide: 40 mass %)

TMAC: 10 mass % aqueous solution of stearyltrimethylammonium chloride

TMAC-50: 10 mass % aqueous solution of coconut oil trimethylammonium chloride (Molecular Weight-Controlling Agent)

nDoSH: n-dodecyl mercaptan (Polymerization Initiator)

VA061A: 10 mass % aqueous solution of 2,2'-azobis[2-(2-imidazolin-2-yl)propane]acetate (Medium)

DPG: dipropylene glycol

DPGMME: dipropylene glycol monomethyl ether

Water: deionized water (Fluorinated Polymer (B))

AD915: PTFE aqueous dispersion (Fluon PTFE AD915 manufactured by Asahi Glass Company, Limited, solid content concentration: 62 mass %, average particle size: 270 nm, Mn: 1,500,000)

AD911: PTFE aqueous dispersion (Fluon PTFE AD911 manufactured by Asahi Glass Company, Limited, solid content concentration: 64 mass %, average particle size: 270 nm, Mn: 1,500,000)

AD939E: PTFE aqueous dispersion (Fluon PTFE AD939E manufactured by Asahi Glass Company, Limited, solid content concentration: 63 mass %, average particle size: 250 nm, Mn: 10,000,000)

(Colloidal Silica)

PS-S: colloidal silica (SNOWTEX PS-S manufactured by Nissan Chemical Industries, Ltd., solid content concentration: 20 mass %, average particle size: 106 nm)

PS-MO: colloidal silica (SNOWTEX PS-MO manufactured by Nissan Chemical Industries, Ltd., solid content concentration: 19 mass %, average particle size: 106 nm)

MP2040: colloidal silica (SNOWTEX MP2040 manufactured by Nissan Chemical Industries, Ltd., solid content concentration: 40 mass %, average particle size: 190 nm)

Production Example 1

Into a glass beaker, 32.6 g of C6FMA, 132.2 g of BeA, 8.1 g of NMAM, 1.1 g of HEMA, 2.2 g of nDOSH, 55.1 g of PEO-20, 11.0 g of P204, 22.0 g of TMAC, 132.2 g of DPGMME and 296.3 g of water were introduced, then heated at 60° C. for 30 minutes and mixed by means of a homomixer (Biomixer manufactured by NIHONSEIKI KAISHA LTD.) to obtain a mixed liquid.

The obtained mixed liquid was treated at 40 MPa by means of a high pressure emulsifying machine (Mini-Lab manufactured by APV Rannie) while maintaining the temperature at 60° C. to obtain an emulsified liquid. The obtained emulsified liquid was put into a stainless steel reactor and cooled to a temperature of at most 40° C. Then, 11.0 g of VA061A was added, and the vapor phase was substituted by nitrogen, and 46.3 g of VCM was introduced, and a polymerization reaction was carried out at 60° C. for 15 hours with stirring, to obtain an emulsion of fluorinated polymer (A-1). The proportions of structural units based on the respective monomers, the solid content concentration and the molecular weight are shown in Table 2.

Production Example 2

Into a glass beaker, 46.3 g of C6FMA, 129.8 g of STA, 25.7 g of BeA, 1.3 g of NMAM, 2.6 g of nDOSH, 51.4 g of PEO-20, 25.7 g of SFY465, 25.7 g of P204, 25.7 g of TMAC, 12.9 g of TMAC-50, 77.1 g of DPG and 264.7 g of water were introduced, then heated at 60° C. for 30 minutes and mixed by means of a homomixer (Biomixer manufactured by NIHON-SEIKI KAISHA LTD.) to obtain a mixed liquid.

The obtained mixed liquid was treated at 40 MPa by means of a high pressure emulsifying machine (Mini-Lab manufactured by APV Rannie) while maintaining the temperature at 60° C. to obtain an emulsified liquid. The obtained emulsified liquid was put into a stainless steel reactor and cooled to a temperature of at most 40° C. Then, 7.2 g of VA061A was added, the vapor phase was substituted by nitrogen, 54.0 g of VCM was introduced, and a polymerization reaction was carried out at 60° C. for 15 hours with stirring, to obtain an emulsion of fluorinated polymer (A-2). The proportions of structural units based on the respective monomers, the solid content concentration and the molecular weight are shown in Table 2. In Table 2, "-" means that no monomer was used, or no measurement was carried out.

TABLE 2

| | Structural units [mass %] | (A-1) | (A-2) |
|---|---|---|---|
| (a) | C6FMA | 14.8 | 18.0 |
| (b) | STA | — | 50.5 |
| (b) | BeA | 60.0 | 10.0 |
| (d) | NMAM | 3.7 | 0.5 |
| (d) | HEMA | 0.5 | — |
| (e) | VCM | 21.0 | 21.0 |
| Solid content concentration [mass %] | | 30.1 | 36.2 |
| Mw | | 33,000 | — |
| Mn | | 11,500 | — |
| Mw/Mn | | 2.87 | — |

Example 1

Preparation of Test Cloth for Evaluation of Water/Oil Repellency

The emulsion of fluorinated polymer (A-1) was diluted with running water in Yokohama city to adjust the solid content concentration to be 1.0 mass %, and then a melamine resin crosslinking agent thermosetting agent (BECKAMINE M3 manufactured by DIC Corporation) and an acid catalyst thermosetting catalyst (BECKAMINE ACX manufactured by DIC Corporation) were added so that the respective concentrations became 0.3 mass %, and further, a blocked isocyanate crosslinking agent thermosetting agent (Meikanate MF manufactured by Meisei Chemical Works, Ltd.) was added so that the concentration became 1.0 mass % to obtain a water/oil repellent composition.

In the water-oil repellent composition, a base cloth (nylon taffeta or PET tropical) was dipped by a padding method, and squeezed so that the wet pickup became 60% in the case of the nylon taffeta or 90% in the case of the PET tropical. This base cloth was heated at 110° C. for 90 seconds and at 170° C. for 60 seconds, and left in a room at 25° C. under a humidity of 60% RH overnight to prepare a test cloth. With respect to the test cloth, the water/oil repellency was evaluated. The results are shown in Table 3.

<Preparation of Test Cloth for Evaluation of Texture>

The emulsion of fluorinated polymer (A-1) was diluted with running water in Yokohama city to adjust the solid content concentration to be 2.5 mass %, and then a melamine resin crosslinking agent (BECKAMINE M3 manufactured by DIC Corporation) and an acid catalyst (BECKAMINE ACX manufactured by DIC Corporation) were added so that the respective concentrations became 0.3 mass % to obtain a water/oil repellent composition.

In the water/oil repellent composition, a base cloth (PET tropical) was dipped by a padding method and squeezed so that the wet pickup became 90%. This base cloth was heated at 110° C. for 90 seconds and at 170° C. for 60 seconds and left in a room at 25° C. under a humidity of 60% overnight to prepare a test cloth. With respect to the test cloth, the texture was evaluated. The results are shown in Table 4.

Example 2

Preparation of Test Cloth for Evaluation of Water/Oil Repellency

The emulsion of fluorinated polymer (A-1) was diluted with running water in Yokohama city to adjust the solid content concentration to be 1.0 mass %, and then AD915 was added so that the solid content of PTFE became 2 parts by mass per 100 parts by mass of the solid content of the fluorinated polymer (A1). Further, a melamine resin crosslinking agent (BECKAMINE M3 manufactured by DIC Corporation) and an acid catalyst (BECKAMINE ACX manufactured by DIC Corporation) were added so that the respective concentrations became 0.3 mass %, and further, a blocked isocyanate crosslinking agent (Meikanate MF manufactured by Meisei Chemical Works, Ltd.) was added so that the concentration became 1.0 mass % to obtain a water/oil repellent composition.

A test cloth for evaluation of the water/oil repellency was prepared in the same manner as in Example 1 except that the above water/oil repellent composition was used. With respect to the test cloth, the water/oil repellency was evaluated. The results are shown in Table 3.

<Preparation of Test Cloth for Evaluation of Texture>

The emulsion of fluorinated polymer (A-1) was diluted with running water in Yokohama city to adjust the solid content concentration to be 2.5 mass %, and then AD915 was added so that the solid content of PTFE became 2 parts by mass per 100 parts by mass of the solid content of fluorinated polymer (A-1). Further, a melamine resin crosslinking agent (BECKAMINE M3 manufactured by DIC Corporation) and an acid catalyst (BECKAMINE ACX manufactured by DIC Corporation) were added so that the respective concentrations became 0.3 mass % to obtain a water/oil repellent composition.

A test cloth for evaluation of the texture was prepared in the same manner as in Example 1 except that the above water/oil repellent composition was used.

With respect to the test cloth, the texture was evaluated. The results are shown in Table 4.

In the following Examples 3 to 10, with respect to the pieces of the test cloth prepared, the results of evaluation of the water/oil repellency are shown in Table 3, and the results of evaluation of the texture are shown in Table 4.

Example 3

Preparation of Test Cloth for Evaluation of Water/Oil Repellency

A water/oil repellent composition was obtained in the same manner as in Example 2 except that AD915 was changed to AD911.

A test cloth for evaluation of the water/oil repellency was prepared in the same manner as in Example 1 except that the above water/oil repellent composition was used.

Example 4

Preparation of Test Cloth for Evaluation of Water/Oil Repellency

A water/oil repellent composition was obtained in the same manner as in Example 2 except that AD915 was changed to AD939.

A test cloth for evaluation of the water/oil repellency was prepared in the same manner as in Example 1 except that the above water/oil repellent composition was used.

Example 5

Preparation of Test Cloth for Evaluation of Water/Oil Repellency

A water/oil repellent composition was obtained in the same manner as in Example 2 except that AD915 was changed to PS-S.

A test cloth for evaluation of the water/oil repellency was prepared in the same manner as in Example 1 except that the above water/oil repellent composition was used.

Example 6

Preparation of Test Cloth for Evaluation of Water/Oil Repellency

A water/oil repellent composition was obtained in the same manner as in Example 2 except that AD915 was changed to PS-MO.

A test cloth for evaluation of the water/oil repellency was prepared in the same manner as in Example 1 except that the above water/oil repellent composition was used.

Example 7

Preparation of Test Cloth for Evaluation of Water/Oil Repellency

A water/oil repellent composition was obtained in the same manner as in Example 2 except that AD915 was changed to MP2040.

A test cloth for evaluation of the water/oil repellency was prepared in the same manner as in Example 1 except that the above water/oil repellent composition was used.

Example 8

Preparation of Test Cloth for Evaluation of Water/Oil Repellency

A water/oil repellent composition was obtained in the same manner as in Example 2 except that AD915 was changed to sorbitol, and that the addition amount was changed so that the solid content of sorbitol became 10 parts by mass per 100 parts by mass of the solid content of fluorinated polymer (A-1).

A test cloth for evaluation of the water/oil repellency was prepared in the same manner as in Example 1 except that the above water/oil repellent composition was used.

<Preparation of Test Cloth for Evaluation of Texture>

A water/oil repellent composition was obtained in the same manner as in Example 2 except that AD915 was changed to sorbitol, and that the addition amount was changed so that the solid content of sorbitol became 10 parts by mass per 100 parts by mass of the solid content of fluorinated polymer (A-1).

A test cloth for evaluation of the texture was prepared in the same manner as in Example 1 except that the above water/oil repellent composition was used.

Example 9

Preparation of Test Cloth for Evaluation of Water/Oil Repellency

A water/oil repellent composition was obtained in the same manner as in Example 1 except that fluorinated polymer (A-1) was changed to fluorinated polymer (A-2).

A test cloth for evaluation of the water/oil repellency was prepared in the same manner as in Example 1 except that the above water/oil repellent composition was used.

Example 10

Preparation of Test Cloth for Evaluation of Water/Oil Repellency

A water/oil repellent composition was obtained in the same manner as in Example 2 except that fluorinated polymer (A-1) was changed to fluorinated polymer (A-2).

A test cloth for evaluation of the water/oil repellency was prepared in the same manner as in Example 1 except that the above water/oil repellent composition was used.

TABLE 3

| Base cloth | Evaluation | | Example | | | | | | | | | |
|---|---|---|---|---|---|---|---|---|---|---|---|---|
| | | | 1 | 2 | 3 | 4 | 5 | 6 | 7 | 8 | 9 | 10 |
| | | | Fluorinated polymer (B) or the like/solid content concentration [mass %] | | | | | | | | | |
| | | | Nil | AD915/ 0.02 | AD911/ 0.02 | AD939E/ 0.02 | PS-S/ 0.02 | PS-MO/ 0.02 | MP2040/ 0.02 | Sorbitol/ 0.1 | Nil | AD915/ 0.02 |
| Nylon taffeta | Water repellency | Initial | 5 | 5 | 5− | 5 | 5 | 5 | 5 | 5 | 5 | 5 |
| | | Washing 20 times | 3 | 3 | 3 | 3 | 3 | 3 | 3 | 3 | 2 | 2− |
| | Bundesmann test | Washing 20 times | 3 | 3.2 | 3.2 | 3.2 | 2.5 | 2.5 | 2.5 | 2.5 | 0 | 0 |
| PET tropical | Oil repellency | Initial | 3 | 3 | 3 | 3 | 2− | 2− | 1 | 1 | 2− | 2 |
| | Water repellency | Initial | 5 | 5 | 5 | 5 | 5 | 5 | 5 | 5 | 5 | 5 |
| | | Washing 20 times | 5 | 5 | 5 | 5 | 4 | 4 | 4 | 4 | 3 | 3 |
| | | Rubbing 2,000 times | 5− | 5 | 5 | 5 | 5 | 5 | 5 | 4 | 3 | 5 |
| | | Rubbing 10,000 times | 4− | 5− | 5− | 5− | 3 | 3 | 3 | 3 | 3 | 4 |

TABLE 4

| PET tropical | Fluorinated polymer (B) or the like/solid content concentration [mass %] | Handle-O-Meter [mN] | Bending resistance [mm] |
|---|---|---|---|
| Not treated | — | — | 51 |
| Example 1 | Nil | 5,310 | 96 |
| Example 2 | AD915/0.02 | 3,864 | 86.5 |
| Example 8 | Sorbitol/0.1 | — | 88 |

INDUSTRIAL APPLICABILITY

The water/oil repellent composition of the present invention can impart water/oil repellency by being mixed with polypropylene, nylon or the like, followed by molding of forming into fibers, and is useful as a water/oil repellent agent for e.g. fiber products (clothing (sports wears, coats, jumpers, work clothes, uniforms, etc.), bags, industrial materials, etc.), nonwoven fabrics, leather products, stone material, concrete building materials, etc., and as a coating agent for filtration material or as a surface protective agent.

This application is a continuation of PCT Application No. PCT/JP2011/068308, filed on Aug. 10, 2011, which is based upon and claims the benefit of priority from Japanese Patent Application No. 2010-180245 filed on Aug. 11, 2010. The contents of those applications are incorporated herein by reference in its entirety.

What is claimed is:

1. A water/oil repellent composition comprising:
    a fluorinated polymer (A) having structural units based on the following monomer (a) and structural units based on the following monomer (b);
    a fluorinated polymer (B) (excluding the fluorinated polymer (A)) having structural units based on the following monomer (c); and
    an aqueous medium (C):
    monomer (a): a compound represented by the following formula (1):

$$(Z-Y)_n X \quad (1)$$

wherein Z is a $C_{1-6}$ polyfluoroalkyl group or a group represented by the following formula (2), Y is a bivalent organic group or a single bond, n is 1 or 2, and X is, when n is 1, any one of the groups represented by the following formulae (3-1) to (3-5) and, when n is 2, any one of the groups represented by the following formulae (4-1) to (4-4):

$$C_i F_{2i+1} O(CFX^1 CF_2 O)_j CFX^2 - \quad (2)$$

wherein i is an integer of from 1 to 6, j is an integer of from 0 to 10, and each of $X^1$ and $X^2$ is a fluorine atom or a trifluoromethyl group;

$$-CR=CH_2 \quad (3-1)$$
    $$-C(O)OCR=CH_2 \quad (3-2)$$
    $$-OC(O)CR=CH_2 \quad (3-3)$$
    $$-OCH_2-\Phi-CR=CH_2 \quad (3-4)$$
    $$-OCH=CH_2 \quad (3-5)$$

wherein R is a hydrogen atom, a methyl group or a halogen atom, and Φ is a phenylene group;

$$=CH[-(CH_2)_m CR=CH_2]- \quad (4-1)$$
    $$=CH[-(CH_2)_m C(O)OCR=CH_2]- \quad (4-2)$$
    $$=CH[-(CH_2)_m OC(O)CR=CH_2]- \quad (4-3)$$
    $$-OC(O)CH=CHC(O)O- \quad (4-4)$$

where R is a hydrogen atom, a methyl group or a halogen atom, and m is an integer of from 0 to 4;
    monomer (b): a (meth)acrylate having no polyfluoroalkyl group and having a $C_{18-30}$ alkyl group;
    monomer (c): a fluoroolefin selected from the group consisting of tetrafluoroethylene, hexafluoropropylene, chlorotrifluoroethylene and vinylidene fluoride.

2. The water/oil repellent composition according to claim 1, wherein a proportion of the structural units based on the monomer (a) in the fluorinated polymer (A) is from 5 to 60 mass % of the structural units (100 mass %) based on all monomers constituting the fluorinated polymer (A); and
    a proportion of the structural units based on the monomer (b) in the fluorinated polymer (A) is from 40 to 95 mass % of the structural units (100 mass %) based on all monomers constituting the fluorinated polymer (A).

3. The water/oil repellent composition according to claim 1, wherein a number average molecular weight of the fluorinated polymer (B) is from 1,000,000 to 30,000,000.

4. The water/oil repellent composition according to claim 1, wherein an amount of the fluorinated polymer (B) is from 0.1 to 10 parts by mass per 100 parts by mass of the fluorinated polymer (A).

5. The water/oil repellent composition according to claim 1, wherein an average particle size of the fluorinated polymer (B) is from 10 to 1,000 nm.

6. An article having a surface treated with the water/oil repellent composition of claim 1.

* * * * *